Patented Aug. 16, 1932

1,871,974

UNITED STATES PATENT OFFICE

ARTHUR H. FLOWER AND JACOB C. HOUSEKEEPER, OF DAYTON, OHIO, ASSIGNORS TO THE INLAND MANUFACTURING COMPANY, OF DAYTON, OHIO, A CORPORATION OF DELAWARE

CELLULAR HEAT INSULATION MATERIAL

No Drawing. Application filed September 20, 1928. Serial No. 307,330.

This invention relates to heat insulation material and method of producing same.

An object of the invention is to provide an inexpensive rigid cellular rubberized material possessing high heat insulating qualities and adapted as a suitable substitute for cork board in building up heat insulating walls on refrigerator cabinets and the like. An important feature of the material is that it will not become brittle at ordinary refrigerating temperatures, nor will it become plastic at high room temperatures such as to cause slabs of the material set vertically in a cabinet wall to partially settle or lose their shape or open up cracks at the joints between the slabs.

Other features of the material of this invention are its light weight and low cost compared to ordinary hard sponge rubber.

Another object of the invention is to provide an improved method of shaping slabs of the rigid cellular insulating material to a uniform thickness and forming a condensed exterior skin thereupon.

Further objects and advantages of the present invention will be apparent from the following description.

In carrying out the invention, we first thoroly plasticize a quantity of reclaim rubber on a rubber mixing mill or Banbury type mixer until very soft and plastic. Then a lesser quantity of petroleum oil refining residuum or mineral rubber is added to the rubber and thoroly mixed therein. It is also desirable to add a small quantity of softener such as petrolatum (petroleum jelly) to facilitate the mixing. A substantial amount of a light weight, fine inert filler such as infusorial earth (celite) and magnesium carbonate is next milled into the mixture. We then mix in the desired quantity of chemicals which during vulcanization of the compound will develop gas cells and thus render the final material cellular in stucture, the size of the cells being controlled by the quantity of gas forming chemicals added. We preferably use sodium bicarbonate, water and magnesium chloride as the gas forming chemicals. Sufficient sulphur and a small percentage of accelerator, such as diphenyl guanidine (D. P. G.), is added to give a hard vulcanization of the compound when cured in an open steam vulcanizer under a steam pressure of 50 pounds for two hours.

A typical compound which has been found to give very good results consists of the following ingredients and proportions by weight:

|   | Per cent |
|---|---|
| Reclaim rubber (from auto tire tubes) | 36.0 |
| Hard stanolite (a tank residiuum from gasoline refining having melting point by B and R method of 135° to 140° F., penetration at 77° F. of 8 to 14 and specific gravity of 1.06) | 12.6 |
| Petrolatum (petroleum jelly) | 3.8 |
| Sulphur | 14.4 |
| Zinc oxide (ZnO) | 1.8 |
| Infusorial earth (celite from California) | 14.7 |
| Magnesium carbonate ($MgCO_3$) | 5.4 |
| Magnesium chloride ($MgCl_2$) | 2.7 |
| Sodium bicarbonate ($NaHCO_3$) | 4.5 |
| Water | 3.6 |
| Diphenyl guanidine (D. P. G.) | 0.54 |

The order of mixing of these ingredients is preferably as outlined above, however, this order of mixing in of the various ingredients is not essential as will be readily recognized by those skilled in the art.

After thoroly mixing this compound into a homogeneous plastic dough, it may be slabbed to the desired thickness by passing between suitably spaced rolls or by forcing the dough thru a suitable die by a large tubing or extruding machine.

The slabbed stock is preferably permitted to age from one to six days, after which it is cut into pieces of desired size. These pieces are laid separately upon a flat metal surface, so that each piece is free to expand in all dimensions, and inserted into an open steam vulcanizer and vulcanized at a steam pressure of about 50 pounds per square inch for about two hours. During vulcanization the gas forming chemicals in the dough produce cells or bubbles thruout the mass, causing great expansion of the slabs in all directions. The vulcanization is continued upon the expanded slabs so that finally the compound is vulcanized rigid in its expanded condition.

When the vulcanization is completed, the expanded material is caused to cool under pressure without releasing the external pressure thereupon caused by the steam during vulcanization. This is accomplished by turning off the steam supply to the vulcanzier and immediately turning on air pressure of about 50 pounds per square inch to maintain the external pressure upon the expanded material substantially unchanged during the cooling thereof. The exterior air pressure upon the expanded material serves to prevent the gas pressure within the cells from rupturing the cell walls to a material extent and hence causing partial collapse of the expanded material while the material is yet hot and less resistant to such rupture.

After cooling the expanded and vulcanized material under air pressure for a sufficient time to prevent such collapse thereof, preferably about an hour and a half, the material is removed from the vulcanizer and allowed to thoroly cool, say from one to six days. The slabs may then be used for building up heat insulating walls, but since they usually are of uneven thickness and have an irregular surface when they come from the vulcanizer, it is preferable to subject them to a subsequent treatment as follows:

A thoroly cooled expanded slab is placed between steam heated platens and by these pressed to the desired thickness. The hot platens compress the cellular material at the upper and lower surface portions thereof where it receives heat from the platens and hence softens and condenses and forms in effect a toughened skin thereupon. After being heated for about three minutes time, steam is turned off and cold water supplied to the platens to thoroly cool the compressed slab. The slab is then removed and is ready for use.

While the form of embodiment of the present invention as herein disclosed, constitutes a preferred form, it is to be understood that other forms might be adopted, all coming within the scope of the claims which follow.

What is claimed is as follows:

1. A rigid cellular heat insulating material adapted for use in building heat insulating walls for refrigerators, which results from vulcanizing in an unconfined state a compound having approximately the following composition:

| | Per cent |
|---|---|
| Reclaim rubber | 36.0 |
| Oil refining residuum | 12.5 |
| Sulphur | 14.5 |
| Zinc oxide | 1.8 |
| Kieselguhr | 14.7 |
| Magnesium carbonate | 5.4 |
| Magnesium chloride | 2.7 |
| Petrolatum | 3.8 |
| Water | 3.6 |
| Sodium bicarbonate | 4.5 |
| Diphenyl guanidine | 0.5 |

2. The method of shaping to uniform thickness and forming a relatively dense skin upon a vulcanized irregular slab of hard cellular rubber comprising: compressing said slab between heated platens to the desired thickness whereby to condense only the surface portions of said cellular slab, and then cooling said platens while in compressed position, whereby to cool and harden the condensed skin on said slab.

In testimony whereof we hereto affix our signatures.

ARTHUR H. FLOWER.
JACOB C. HOUSEKEEPER.